June 8, 1965 L. PÉRAS 3,187,914
COLLAPSIBLE SUPPORTS FOR SPARE WHEEL OF VEHICLES
Filed Nov. 15, 1962 3 Sheets-Sheet 1

Inventor
Lucien Péras
By Stevens, Davis, Miller & Mosher
Attorneys

June 8, 1965 L. PÉRAS 3,187,914
COLLAPSIBLE SUPPORTS FOR SPARE WHEEL OF VEHICLES
Filed Nov. 15, 1962 3 Sheets-Sheet 2
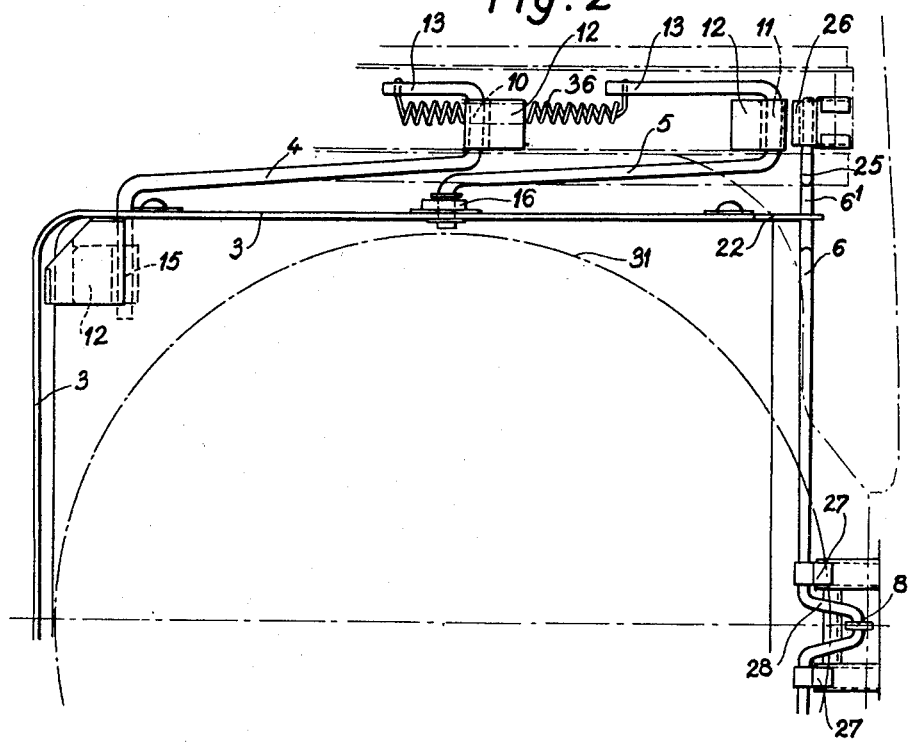
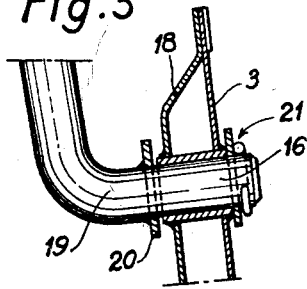
Inventor
Lucien Péras
By Stevens, Davis, Miller & Mosher
Attorneys

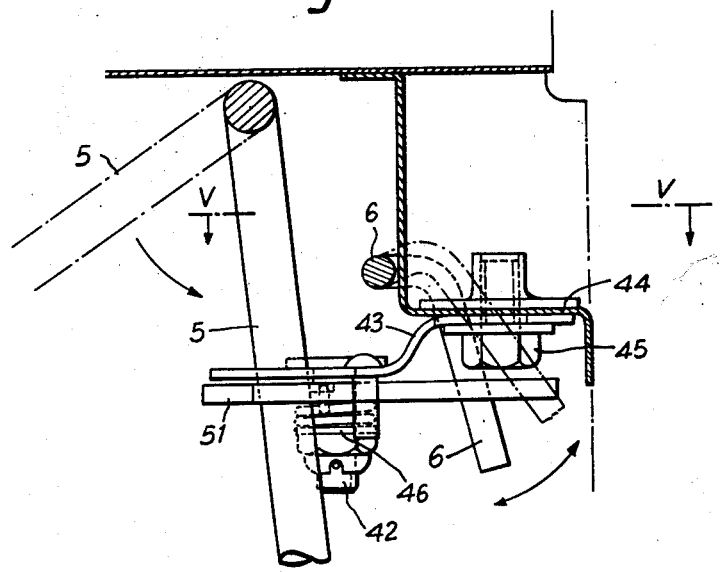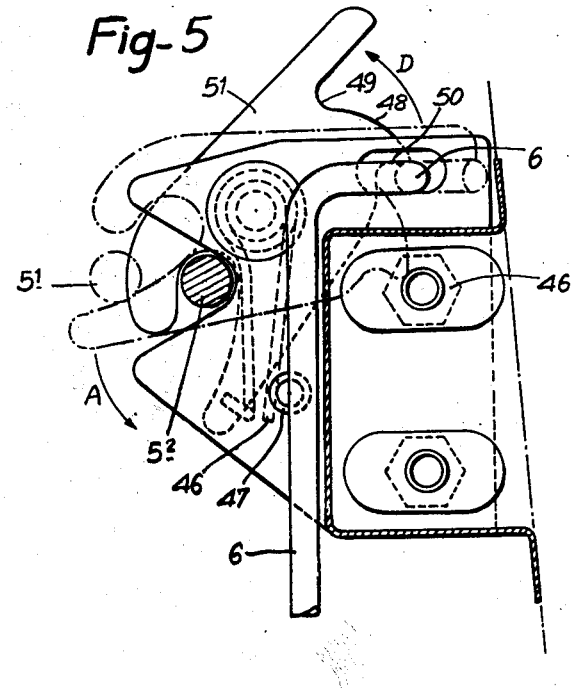

United States Patent Office 3,187,914
Patented June 8, 1965

3,187,914
COLLAPSIBLE SUPPORTS FOR SPARE WHEEL OF VEHICLES
Lucien Péras, Billancourt, France, assignor to Regie Nationale des Usines Renault, Billancourt, France
Filed Nov. 15, 1962, Ser. No. 237,814
Claims priority, application France, Dec. 13, 1961, 881,860, Patent 1,315,870
6 Claims. (Cl. 214—451)

The invention relates to supports for the spare wheel of vehicles and has specific reference to a collapsible support for a spare wheel disposed substantially horizontally under the floor or chassis frame of the vehicle, in the normal or driving position, means being provided for moving the spare wheel to a substantially horizontal position but somewhat outside the plane of the vehicle body so that it can easily be removed from the support.

The spare wheel support according to this invention consists essentially of a casing closed on three sides, adapted to receive the spare wheel and connected to the vehicle frame by means of a pair of pivoted arms disposed on either side of the casing and constituting a deformable parallel motion so that the casing can be displaced from an upper, inoperative position under the chassis frame to a lower position, partially outside the chassis frame, in which the wheel can easily be extracted from the casing.

A lock comprising a keeper and a rocking bolt permits of maintaining the loaded wheel support in its retracted position under the frame.

Other features and advantages of this invention will appear as the following description proceeds with reference to the accompanying drawings in which:

FIGURE 2 is a plane view from above showing one-half of the casing;

FIGURE 3 is a section showing a detail of a pivotal mounting on the casing, the section being taken upon a line III—III of FIG. 1;

FIGURES 4 and 5 are detail views showing the component elements of the wheel support locking device in the lower position.

Figure 1:
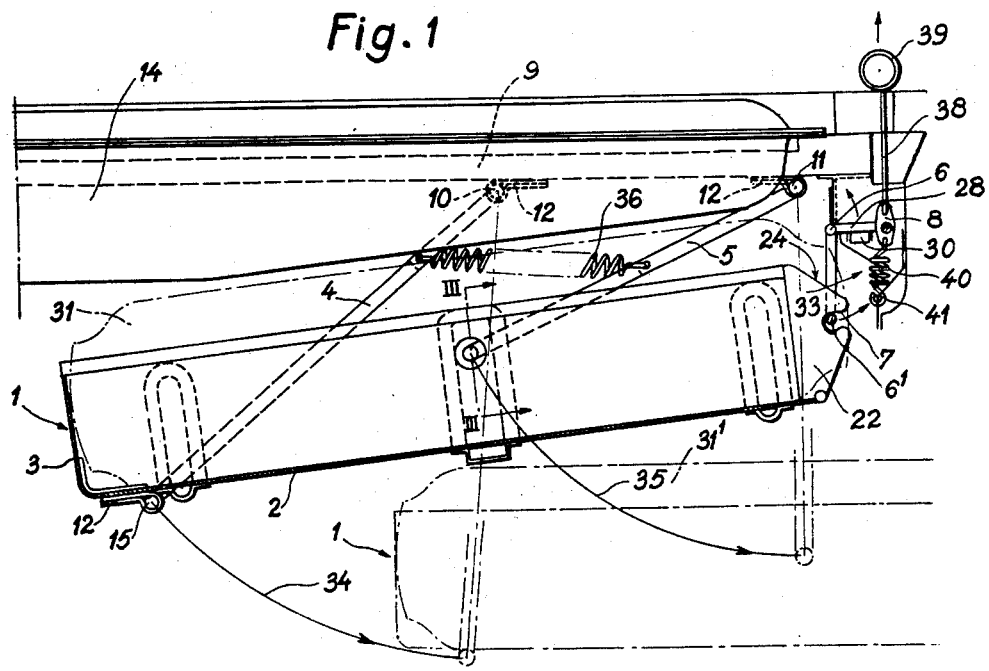
FIGURE 1 is a fragmentary vertical section taken on the longitudinal medial plane of the vehicle frame, showing the mounting of the spare wheel support casing.

The spare wheel support consists essentially of a substantially parallelepipedic pressed-sheet casing 1 with rounded corners, comprising a bottom 2 of substantially square configuration and surrounded on three sides by upstanding walls 3 of a height corresponding to the wheel thickness.

Two pairs of links 4, 5 disposed on either side of the casing 1 and pivoted on the frame and casing constitute a pair of deformable parallel-motion systems.

A device for releasably locking the casing in its upper inoperative position is provided and comprises essentially on the one hand a rod 6 with bolt-forming cranked portions 6′ adapted to engage corresponding pairs of keepers on the casing, and on the other hand a plate member 8 connected to the control member of the system.

The two pairs of links 4 and 5 are pivoted on the frame 9 by means of a pair of bearings 10, 11 consisting of suitably shaped pressed sheet metal lugs 12 welded or bolted on the chassis frame.

These links have their free ends 13 bent at right angles to the axis of the relevant bearings 10, 11 so as to be retained therein. If permitted by the dimensions of the elements carried by the chassis in the plane of these end portions, the links 4, 5 may be interconnected at their ends. In the arrangement shown in the drawings, this is possible only for the link 5, the petrol tank 14 preventing this coupling of the links 4. In the example illustrated, a tension spring 36 attached to the free ends of links 4, 5 acts as a balance spring.

The lower end of link 4 is pivoted at 15 on the bottom 2 of casing 1 by means of a lug 12 described hereinabove, the lower end of arm 5 being pivoted at 16 on the side wall 3 parallel to the longitudinal axis of the vehicle. The pivotal mounting 16 consists of a socket 17 welded on the wall 3 and a reinforcing plate 18, the lower bent portion 19 of link 5 being threaded through this socket and retained therein by a welded washer 20 and a conventional circlip 21.

The pivotal mountings 10, 11, 15 and 16 may of course be completed by friction or rubber braking devices (in the form of washers or bushes).

The two keepers 7 consist of a pair of insert members 22 welded on the two free ends of the longitudinal side walls 3. Formed in these members 22 are a keeper-forming, hook-shaped central notch 7 and a ramp-like upper inclined portion 24.

The locking rod 6 consists of a cylindrical rod having its end portions 25 held in bearings 26 consisting in turn of pressed sheet-metal lugs bolted on the chassis frame of the vehicle. The end portions $6^1$ are cranked so as to have a U or V-shaped configuration and constitute a pair of bolts engageable in the keepers 7. Another pair of bearings 27 are provided in the central portion 28 of this rod which is cranked to a V-shaped configuration; the plate member 8 is pivoted on this cranked portion 28 and connected in turn through a pull wire 38 to a control handle or ring 39. A central stop 30 permits of limiting the angular movement of the rod 6 in the direction in which it is urged by a tension spring 40 having one end attached to the plate member 8 and the other end attached to the frame at 41.

The spare wheel support of this invention operates as follows:

The outer contour of the spare wheel 31 is shown in chain-dotted line in the casing 1, the latter being held in its upper position under the vehicle frame; in this position the bolt-like cranked portions $6^1$ of rod 6 engage the keepers 7.

To extract the spare wheel the user pulls the ring 39 to move the plate member 8 and cranked, bolt-like portions $6^1$, 28 upwards; consequently the cranked portions $6^1$ are pivoted in the direction of the arrow 33 and disengaged from the keepers 7. Thus, the casing 1 is dropped by gravity and the links 4, 5 pivot about the axis of their cranked portions 10, 11, the pivotal connections 15 and 16 describing circular arcs 34 and 35 until the wheel and its casing reach their position $31^1$ in which they lie partially outside the vertical projection of the vehicle contour, so that the wheel can easily be seized and extracted from the casing 1.

To reinsert the wheel in position under the frame, the user introduces the wheel into the casing 1 and then pushes the latter under the frame. Thus, during this movement the two bolts $6^1$ slide along the cam faces or ramps 24 before engaging the corresponding keepers 7 and locking the assembly in the retracted or inoperative position. This movement of the collapsible casing 1 is facilitated by the action of the balance spring 36 counterbalancing at least one fraction of the casing and wheel assembly.

In the lower position 31′ of the wheel it may be convenient to lock the casing 1 in order to facilitate the introduction of the spare wheel through the front of the casing 1. To this end, one or two locks of the type described in the U.S. Patent No. 2,795,947 of June 18, 1957, filed by the same applicant so that one or both arms 4, 5 can be held against movement in the desired position.

FIGURES 4 and 5 illustrate respectively in side view and fragmentary section, and in plane view from above, the locking device associated with one of the links 5 of the casing, according to the arrangement of the patent above referred to.

Pivoted hooks 51 are suitably mounted on either side of the movable casing. Considering one of the hooks as shown in FIGS. 4 and 5 it will be seen that it is pivotally mounted on a pin 42 carried by a support 43 secured on a reinforcing plate 44 of the frame by means of bolts 45. A hairpin tension spring 46 wound on the pin 42 has one arm engaging a stationary pin 47 and its other arm engaging a hook 51. This hook has formed opposite its fork-like aperture a ramp or cam face 48 comprising two notches 49, 50 for a purpose to be explained presently, these notches being adapted to be engaged by the ends of rod 6. The hook 48 lies on the path of the movement described by the link 5 when the casing is moved from its upper position to its lower position in which the wheel can be removed therefrom. During its movement toward the lower position the link 5 passes through a position $5^1$ in which it engages one of the arms of the hook fork in the open position shown in chain-dotted lines in FIG. 5. The end portion of rod 6 is then engaged in notch 49 for the hook is urged by its tension spring 46 to its inoperative position. When the link 5 engages the open fork, it causes the hook to pivot in the direction of the arrow A (FIG. 5) and the hook fork fits over the link 5 at $5^2$.

During this movement the end portion of rod 6 slips over the ramp 48 in the direction of the arrow D (FIG. 5) and engages the notch 50, thus locking the hook and holding the casing against motion; under these conditions, the wheel can be removed without difficulty.

During the reverse sequence of operations, after the user has fitted a wheel in the casing 1, the latter is pushed back to bring it to the upper position in which it is subsequently locked by the engagement of the cranks $6^1$ of rod 6 in notches 7. During this movement the link 5 (at $5^2$) bears against the other arm of the fork; and the rod end 6 is disengaged from notch 50 so as to slide along the ramp 48 in the direction opposite to the arrow B, until it engages the notch 49 in the inoperative position.

Finally, the rod 6 could consist of a torsion bar having a certain curvature in the locked position; in this case, the end portions 25 of the rod are resiliently locked in the supports 26.

Of course, various modifications may be brought to the form of embodiment shown and illustrated herein, without however departing from the spirit and scope of the invention as set forth in the appended claims.

I claim:
1. A spare wheel support for automobile vehicles comprising a casing, means pivotally mounting the casing under a chassis for movement between a first storage position and a second loading and unloading position beyond the chassis and below the storage position, means for locking the casing in each of said first and second positions and means for unlocking the casing while in the first position whereby gravity acts to move the casing to the second position, said means for pivotally mounting the casing comprising two pairs of parallel arms, one pair being longer than the other pair whereby the casing is inclined to the horizontal in the first position and is parallel to the horizontal in the second position.

2. A device as in claim 1 further including a pair of balance springs connecting the arms of one pair to the arms of the other pair.

3. A device as in claim 1 wherein the means for locking the casing in the first position comprises a crank rod pivotally mounted on the chassis, and keeper means for receiving the cranks.

4. A device as in claim 3 wherein the means for unlocking the casing comprises a rod and means connecting the rod to the crank rod for rotating same in a direction to withdraw the cranks from the keepers.

5. A device as in claim 3 further comprising cam means on the casing and in the plane of swinging of the cranks for pivoting the cranks through a given angle and then releasing the cranks for movement into the keeper means.

6. A device as in claim 1 wherein the means for locking the casing in the second position comprises a hook pivotally mounted on the chassis for engagement with the mounting means.

References Cited by the Examiner
UNITED STATES PATENTS

| 1,879,304 | 9/32 | Kennedy et al. | 214—451 |
| 2,063,092 | 12/36 | Groden | 214—451 |
| 2,726,022 | 12/55 | Olson | 224—42.21 |
| 2,773,719 | 12/56 | Walker | 214—451 X |
| 2,776,791 | 1/57 | Brundage et al. | 224—42.21 |

HUGO O. SCHULZ, Primary Examiner.